(12) United States Patent
Ou

(10) Patent No.: US 12,075,823 B2
(45) Date of Patent: Sep. 3, 2024

(54) GLASS TIP WITH CROSS CUT END FOR USE WITH SMOKABLE SUBSTANCES CONTAINED WITHIN A WRAP AND METHOD FOR MANUFACTURING THE TIP

(71) Applicant: R.Y.L. Inc., Commerce, CA (US)

(72) Inventor: Suk Hwan Ou, Commerce, CA (US)

(73) Assignee: R.Y.L. INC., Commerce, CA (US)

( * ) Notice: Subject to any disclaimer, the term of this patent is extended or adjusted under 35 U.S.C. 154(b) by 513 days.

(21) Appl. No.: 17/475,922

(22) Filed: Sep. 15, 2021

(65) Prior Publication Data

US 2023/0079563 A1    Mar. 16, 2023

(51) Int. Cl.
| | |
|---|---|
| *C03B 23/09* | (2006.01) |
| *A24D 1/04* | (2006.01) |
| *A24D 3/18* | (2006.01) |
| *A24F 7/00* | (2006.01) |
| *C03B 23/043* | (2006.01) |
| *C03B 33/095* | (2006.01) |

(52) U.S. Cl.
CPC ............... *A24D 3/18* (2013.01); *A24D 1/042* (2013.01); *A24F 7/00* (2013.01); *C03B 23/043* (2013.01); *C03B 23/095* (2013.01); *C03B 33/095* (2013.01)

(58) Field of Classification Search
CPC .................................................. C03B 23/095
See application file for complete search history.

(56) References Cited

U.S. PATENT DOCUMENTS

| | | | |
|---|---|---|---|
| 5,509,430 A | 4/1996 | Berger | |
| 2001/0037660 A1* | 11/2001 | Delgado-Carranza | C03B 23/112 65/109 |
| 2016/0107918 A1* | 4/2016 | Delgado Carranza | C03B 23/11 65/110 |
| 2016/0244354 A1* | 8/2016 | Segner | C03B 23/095 |
| 2017/0208859 A1 | 7/2017 | Ou | |
| 2019/0161380 A1* | 5/2019 | Gaylo | C03B 23/095 |
| 2020/0170294 A1 | 6/2020 | Lalehzadeh | |

(Continued)

FOREIGN PATENT DOCUMENTS

WO    WO-2009116300 A1 * 9/2009 ............. B08B 9/283

OTHER PUBLICATIONS

International Preliminary Report on Patentability received for International Application No. PCT/US2022/043713, mailed Mar. 28, 2024, 7 pages.

(Continued)

*Primary Examiner* — Cynthia Szewczyk
(74) *Attorney, Agent, or Firm* — WOMBLE BOND DICKINSON (US) LLP

(57) ABSTRACT

A method of manufacturing a tip for use with smokable substances. A tube is rotated while applying heat in a horizontal and vertical direction to an end of the tube. The heated end is squeezed with rollers and while a rotating t-shaped plug is inserted into the heated end of the tube. The rollers and t-shaped plug are removed and a scoring wheel is applied to the tube to create a scratch. Then heat is applied to the scratch. An end of the tube is clamped with a rotating chuck and water is sprayed at the scratch to create a thermal shock which separates the tube into two pieces. Heat is applied to a section of one end of the pieces. Tapered rollers are applied to the heated section to taper a diameter of the piece along the heated section.

9 Claims, 4 Drawing Sheets

(56) References Cited

U.S. PATENT DOCUMENTS

2020/0221761 A1 7/2020 Alvarez De La Cadena et al.
2021/0378293 A1 12/2021 Adams et al.

OTHER PUBLICATIONS

International Search Report and Written Opinion received for PCT Patent Application No. PCT/US2022/043713, mailed on Jan. 13, 2023, 8 pages.

* cited by examiner

GLASS TIP WITH CROSS CUT END FOR USE WITH SMOKABLE SUBSTANCES CONTAINED WITHIN A WRAP AND METHOD FOR MANUFACTURING THE TIP

FIELD

The invention is directed to a tip made of glass or similar materials for use with rolled papers or similar materials containing tobacco or other smokable substances. The invention is also directed to a method of manufacturing such a tip.

BACKGROUND

Various devices exist for smoking substances such as tobacco. The most commonly used device is a cigarette or cigar, which consists of tobacco or other smokable substance rolled within a thin paper which can be made from a variety of products. The cigarette or cigar is ignited at one end and smoke, which is emitted from the smokable substance (once ignited or smoldering), is inhaled or tasted from the other end. However, the paper or other substance tends to breakdown with moisture from the mouth and heat from the substance being smoked. As a result, a tip made of glass or a similar material to which the paper containing the smokable substance is attached by being wrapped around the tip is sometimes used. Although the term tip is used herein, the device is sometimes referred to as a filter. Accordingly, the device can be considered to be either a tip or a filter.

SUMMARY

The invention is directed to a glass tip and a process of manufacturing the tip. The glass tip is for use with a substance (e.g. tobacco) to be smoked which is wrapped in paper or similar material. The tip which is generally cylindrically shaped is gradually tapered from a wide end to a narrow end. There are openings at both ends through which smoke from a smokable substance passes when a user inhales after the substance is ignited. The smokable substance is placed on the paper which is then wrapped around the smokable substance to form a tube which contains the substance. A small space may be maintained at one end of the paper so that the end when formed as part of the tube can fit over the tip, or the tip can simply be pressed into the paper tube which would force any of the smokable substance in the tube further into the tube. Such force, although it may slightly compress the substance within the tube, has little if any effect since the amount of compression of the smokable substance is very small.

The process for making the cross-cut tip includes heating one end of a tube (e.g. a glass tube) in the shape of a cylinder having an opening at both ends. The tube should be rotating at from 200 revolutions per minute (RPM) to 300 RPM during the entire process. After the tube is heated enough to manipulate it, in one embodiment, in an initial step, a rotating t-shaped steel plug is inserted into one end while pressure is applied to the rotating side wall of the tube by steel or carbon rollers so that the outer diameter of the tube is maintained by the pressure from the rollers while the rotating t-shaped steel plug is inserted to form a t-shape in the end of the tube. That is, the tube and the plug rotate at the same speed while the pressure from the rollers maintains the outer diameter which creates a t-shape or cross cut in that end of the tube.

After this step, the roller and t-shaped plug are removed and the tube is scratched with a carbide scoring wheel then heated at a location which defines the length of the cross-cut tip. A very fine flame is applied to the scratched area. A fine spray of water is applied to the scratched area to create a thermal shock to separate the tube and the formed cross-cut tip. Heat is then applied to the separated end of the cross-cut tip to soften its edges. Then tapered steel or carbon rollers are applied to the heated softened separated end to form a slight taper at that end.

In this manner, a glass tip is formed which has a cross-cut in one end and a tapered other end. The tip includes a chamber which extends from the cross-cut end to the tapered end.

In another embodiment, a cross-cut tip for use with a substance to be smoked wrapped in paper or similar material is provided. The tip may include a receiving chamber having an open end dimensioned to receive the end of the paper or similar material containing the smokable substance which is wrapped around the smokable substance to form a cylinder or cone which is attached to the tip at one end. In this regard, although the term cone is used herein, the actual shape of the wrapper in this case is a conical frustrum since the end which would be the tip of the cone is not present. However, for ease of reference, and since not important to an understanding of the invention, all references to cone herein should be understood be a conical frustrum. In the case of a cone, the narrow end, that is the end with the smaller diameter, is the one attached to the tip. The receiving chamber extends the length of the cross-cut tip to the opposite end of the tip which also has an opening to allow smoke from the smokable substance to be inhaled. This second opening may be axially aligned with the open end of the receiving chamber. Since the tip is tapered at one end, one of the two open ends has a larger outside diameter than the other end. In most cases, the narrow end of the cone which is attached to the tip is attached to the end of the tip with the larger diameter. However, the cone may be attached to either end of the tip.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention in the interest of reducing the total number of drawings, and as a result, not all elements in the figure may be required for a given embodiment.

DETAILED DESCRIPTION

Several embodiments of the invention with reference to the appended drawings are now explained. Whenever aspects of the embodiments described here are not explicitly defined, the scope of the invention is not limited only to the parts shown, which are meant merely for the purpose of illustration. Also, while numerous details are set forth, it is understood that some embodiments of the invention may be practiced without these details. In other instances, well-known machines, structures, and techniques have not been shown in detail so as not to obscure the understanding of this description.

Figure 1:
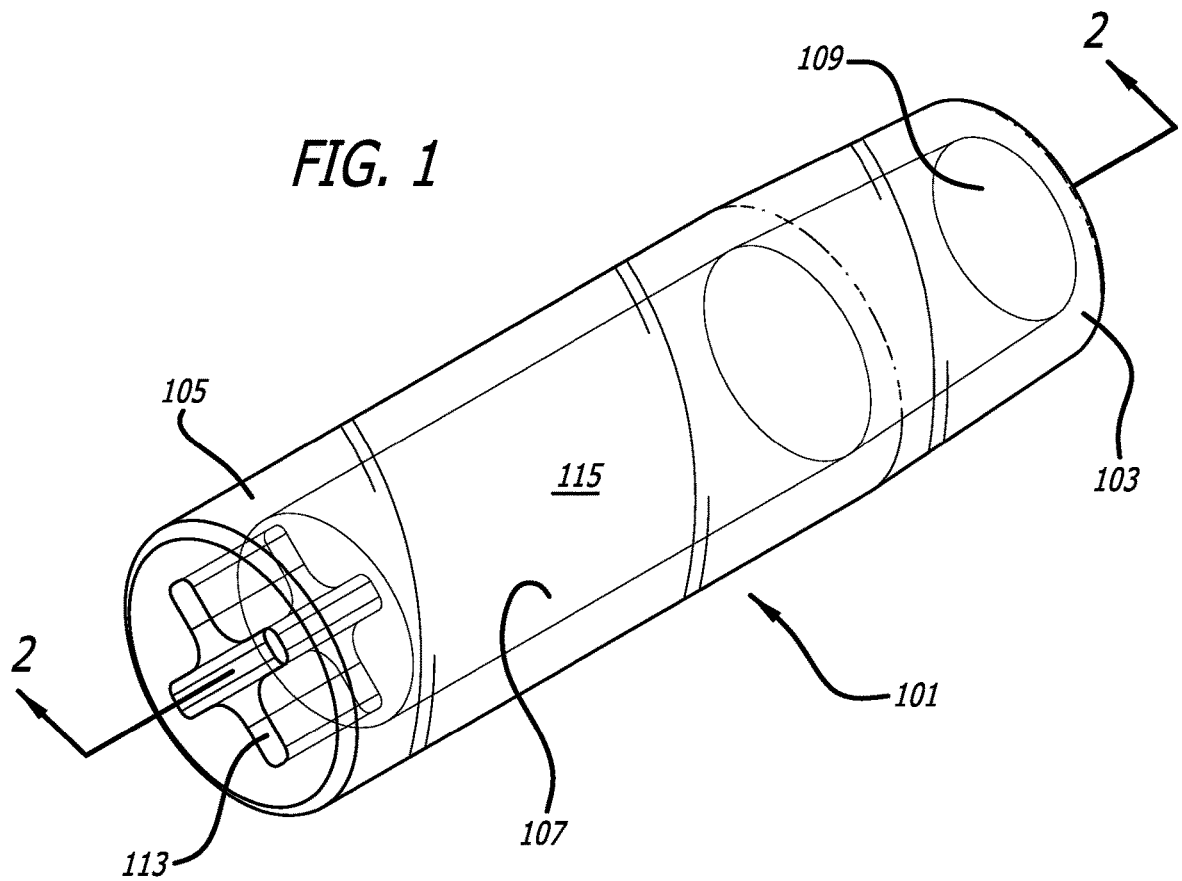
FIG. 1 illustrates a perspective view of one embodiment of the invented cross-cut glass tip.

FIG. 1 illustrates one embodiment of a tip from which a substance in a wrapper may be smoked. In one embodiment, tip 101 may be a tip that includes a first end portion 103, a second end portion 105 and a middle portion 107. The first end portion 103 may be substantially open by first end opening 109. The second end portion 105 may be substantially open with an opening 113 through which a fluid may pass from the first end portion to the second end portion. The fluid may, for example, be a vapor or gas given off by a substance (e.g. tobacco) within a wrapper. The middle portion 107 may be a tubular member having a substantially hollow interior 115. The substance to be smoked (e.g. tobacco) may be packed within a wrapping paper (not shown in FIG. 1) formed into cylinder or cone containing the smokable substance by inserting second end portion 105 into one end of the cylinder or cone such that the cylinder or cone surrounds second end portion 105. During use, a flame is applied to an end of the cylinder or cone containing the smokable substance opposite the end surrounding end portion 105 so that the substance packed within the wrapper is caused to burn or smolder and emit a vapor. The vapor from the burning or smoldering substance then can be inhaled by a user through the opening 109 after passing through opening 113 and middle portion 107. The arrangement of the wrapping paper and second end portion 105 could also be arranged so that the paper wraps around end 103 instead.

Figure 2:
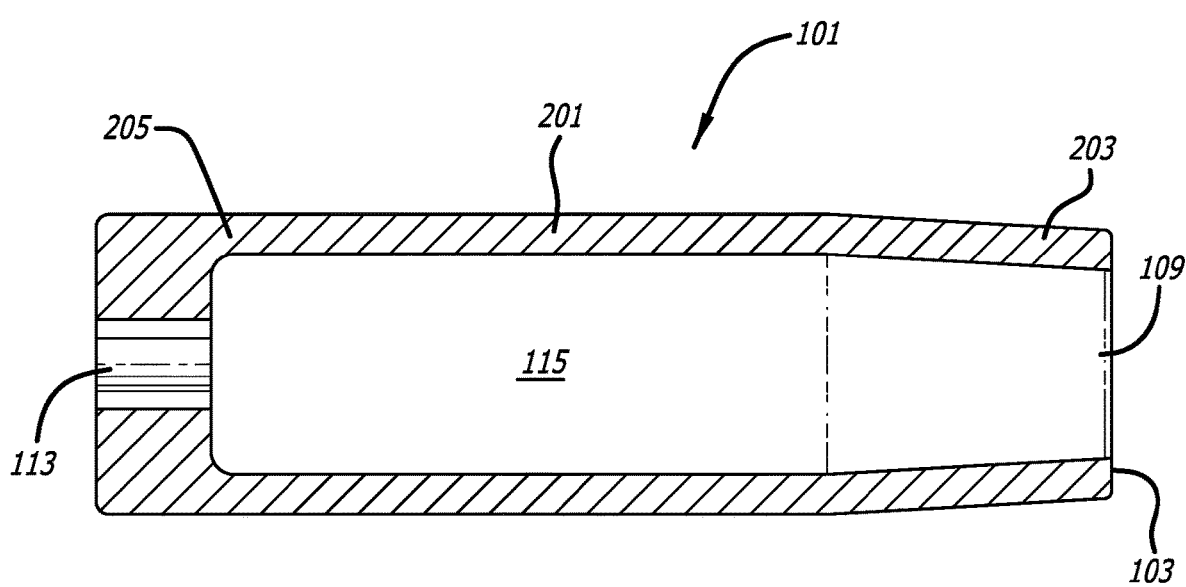
FIG. 2 illustrates cross section of the cross-cut glass tip taken along line 2-2 of FIG. 1.

FIG. 2 illustrates a cross-sectional side view of the tip of FIG. 1 along line 2-2. From this view, it can be seen that the substantially hollow interior 115 of tip 101 is defined by wall 201, first end portion 103 is defined by wall 203, and second portion 105 is defined by wall 205. As best seen in FIG. 2, walls 201, 203 and 205 are relatively uniform in thickness.

The diameter of tip 101 should be sized so that a paper cylinder or cone containing a smokable substance will fit around end 105 of tip 101 and held in place by friction and/or an adhesive, which may be moisture activated, applied to tip 101 and/or the end of the wrapper which fits around end 105. As noted above, the paper could be wrapped around end 103 rather than end 105.

Figure 3:
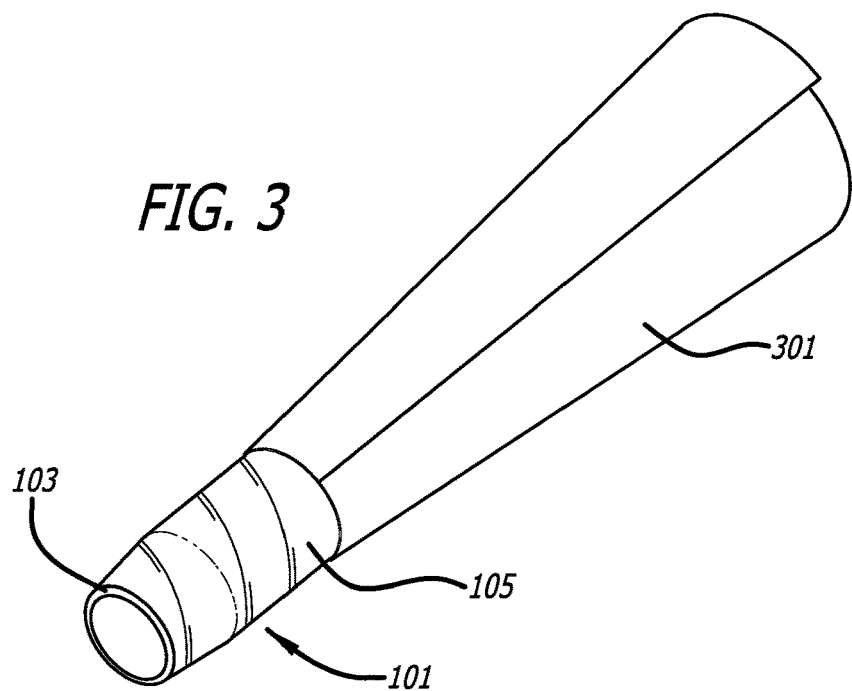
FIG. 3 illustrates the cross-cut glass tip with an applied wrapper.

FIG. 3 shows tip 101 with a wrapper 301 containing a smokable substance attached to end 105 of tip 101. As shown in FIG. 3, wrapper 301 is in the shape of a cone with its narrow end around end 105. Although wrapper 301 is not part of the invention, it is shown in FIG. 3 to illustrate how tip 101 is used with wrapper 301. As previously noted, wrapper 301 could also be in the form of a cylinder. The are many known techniques for filling wrapper 301 with a smokable substance and forming the wrapper into a cone (or cylinder). However, since the details surrounding wrapper 301 and its smokable substance content are not needed for an understanding of the invention, such details are not set forth herein. However, as should be evident, the amount of overlap of wrapper 301 with tip 101 should be sufficient to ensure that the wrapper remains attached to the tip while in use, without extending too close to end 103.

Figure 4:
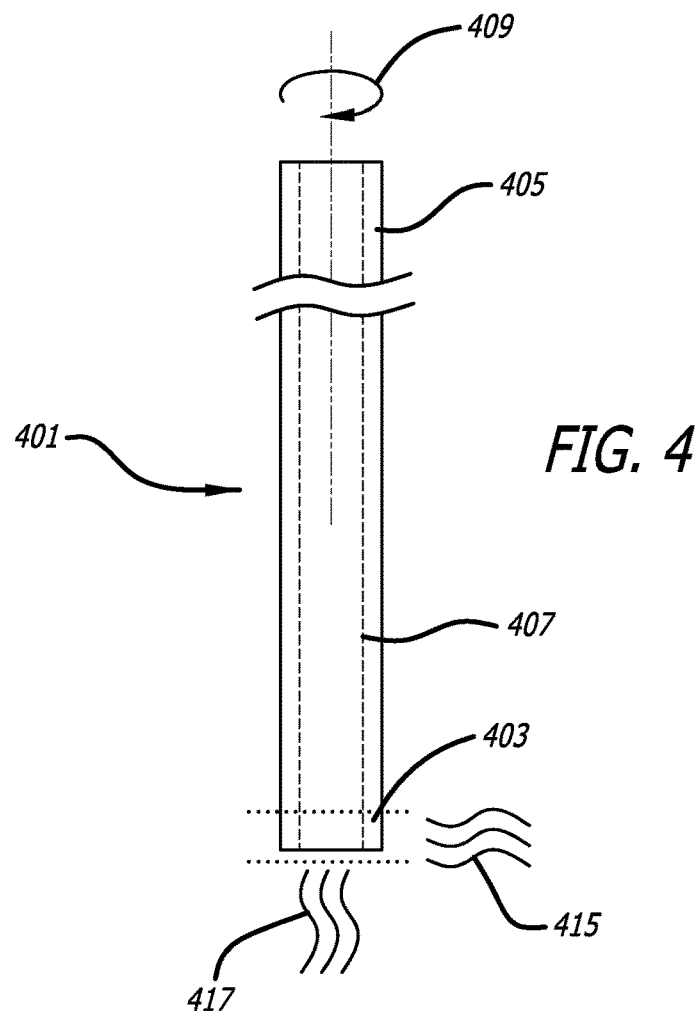
FIG. 4 illustrates a glass tube being processed with a first step during which heat is applied to an end of the tube as the tube is rotating.

FIG. 4 illustrates a side view of one embodiment of a tube from which a tip for use with a wrapper may be manufactured. Tube 401 may, for example, be a glass tube made from clear borosilicate glass (33 exp) such as that available from Pacific Vial Manufacturing Inc., of Commerce, California Tube 401 may include a first end portion 403 and a second end portion 405 which are connected by a middle portion 407. The second end portion is shown as being separated from middle portion 407. However, tube 401 is a single continuous piece from which multiple glass tips are formed. After each tip is formed as described with reference to FIGS. 4-10, the tube 401 is lowered so as to enable the next tip to be formed by repeating steps 1-7 until the entire length of tube 401 has been utilized to make additional tips.

As shown in FIG. 4, tube 401 may be rotated as shown by arrow 409 throughout all of the processing operations as disclosed herein. In an embodiment, tube 401 may be rotated at a rate of from about 200 revolutions per minute (RPM) to about 300 RPM during the entire process described with reference to FIGS. 4-10. Tube 401 may be rotated by inserting tube 401 into any conventional machine operable to rotate a tube at the desired RPM.

During a first step, once tube 401 is rotating, heat 415 and 417 may be applied to section 403 of tube 401. The heat 415 and 417 may be applied by, for example, a burner aligned with section 403 and a burner under section 403. The heat is applied to reduce the size of the opening of section 403 by about 25%-30%. In an embodiment, the burner under section 403 is at an angle of 45 degrees to end of section 403 to apply heat 417, but the angle of heat application can be varied if necessary to obtain desired size of the opening of section 403. In an embodiment, oxygen, natural gas and compressed air are combined to form a flame so that the temperature of the applied heat is set so that the glass to which it is being applied will soften so that the glass is easily stretched and shaped as is well known in the art. However, by way of example, the working point temperature for clear borosilicate glass (33 exp) is 1240° C., with a softening point of 825° C. and an annealing point of 565° C. The specifics of the ratios of the, oxygen, natural gas and compressed air to reach the desired temperature depend on the type of glass or other material used to make the tip, the specifics of which are well known in the art. Heating section 403 softens the glass material of tube 401 so that the heated portion of the tube may be formed so that section 403 has a t-shaped end.

Figure 5:
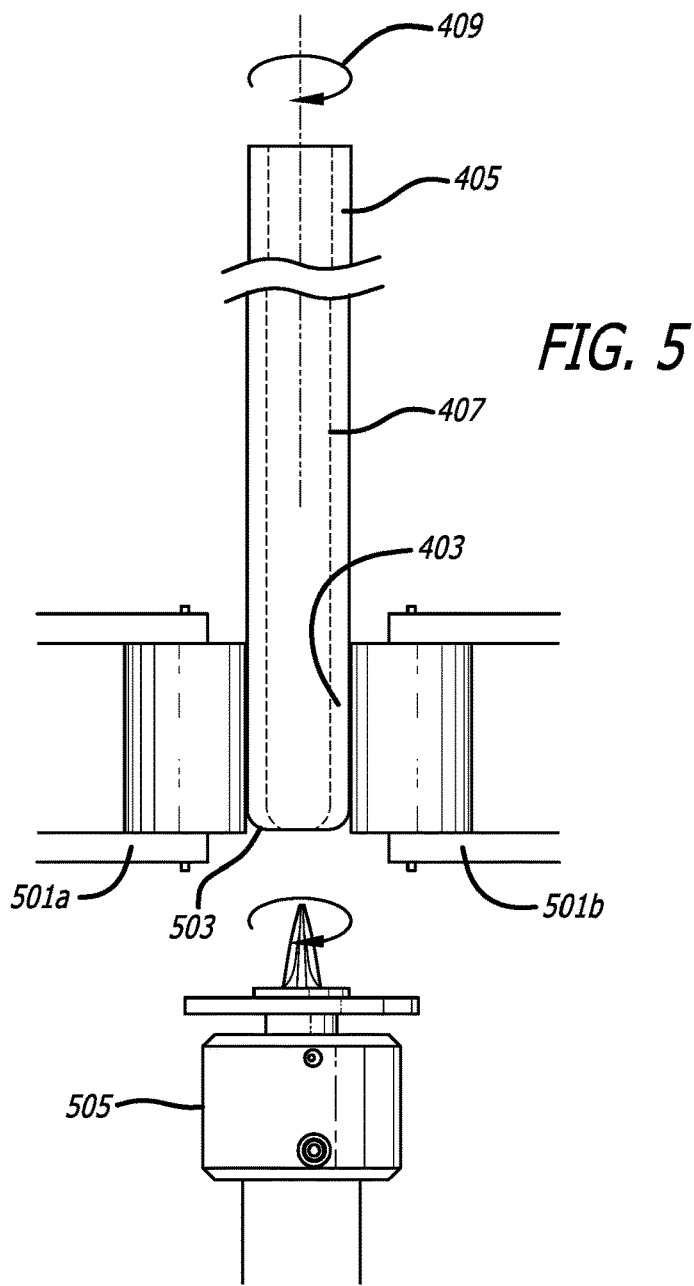
FIG. 5 illustrates the glass tube being processed with a second step during which a pair of rollers apply pressure to the end of the tube heated during the first step while a rotating t shaped plug is inserted into the end of the tube which had heat applied.
Figure 6:
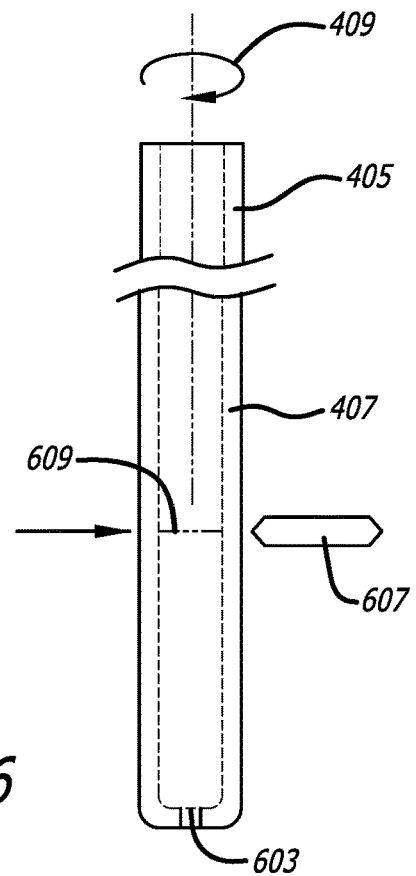
FIG. 6 illustrates the glass tube being processed with a third step during which a carbide scoring wheel is used to scratch the tube at a location where the cross-cut glass tip will be separated from the glass tube.

As shown in FIG. 5, during a second step, once section 403 shown in FIG. 4 has been sufficiently heated and the open end closed 25%-30%, rollers 501*a* and 501*b* which in an embodiment are made of steel or carbon apply an inward force, to section 403, while a t shaped steel plug 505 is inserted into the end 503 of section 403. The steel plug rotates at the same speed as the glass tube so that the pressure from rollers 501*a* and 501*b* maintain the outer diameter of tube 401 while a t shaped cross-cut is formed at end 503. The t-shaped cross-cut is shown in FIG. 6 at end 603 in cross-section. In an embodiment, the pressure from the rollers and t-shaped plug is about 2-4 pounds per square inch and is applied for about 3 seconds. The specifics of the amount of pressure and time may vary based on the rotation speed, material used and amount of heat applied.

In step 3 shown in FIG. 6, a carbide scoring wheel 607 is applied to section 407 of tube 401 above end 603 to form a scratch 609 to section 407. The distance between scratch 609 and end 603 corresponds to the length of a fully formed glass tip 101.

Figure 7:
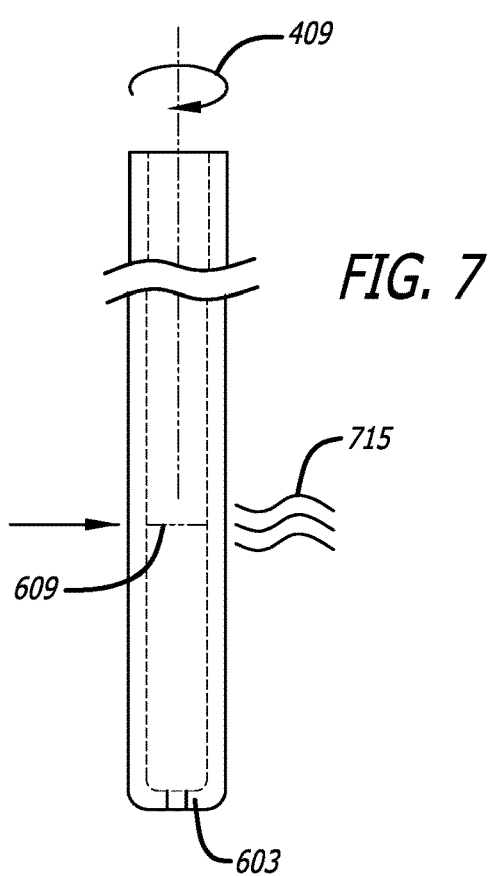
FIG. 7 illustrates the glass tube being processed with a fourth step during which heat is applied to the tube where it was scratched during the third step.
Figure 8:
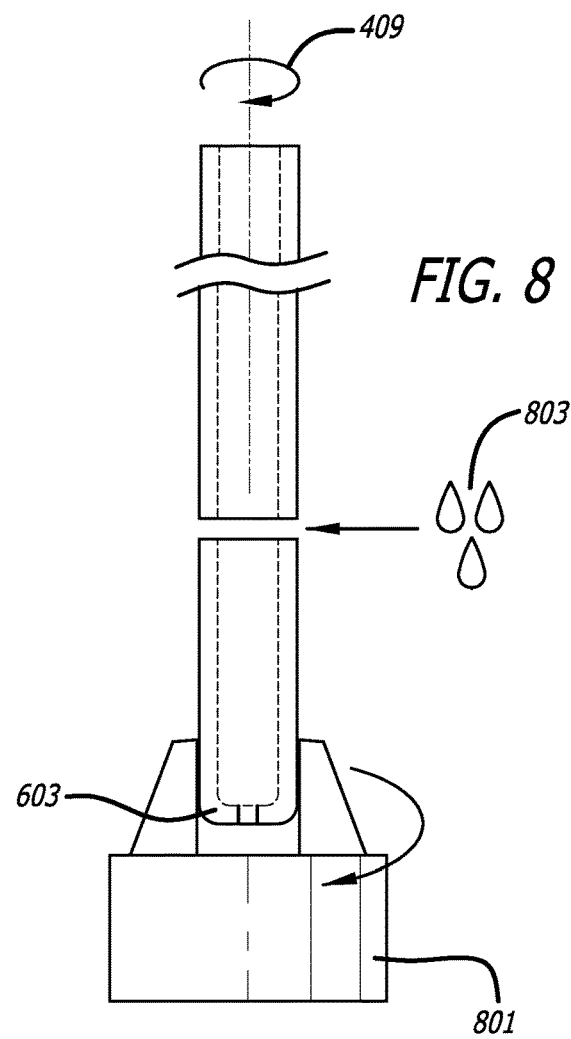
FIG. 8 illustrates the glass tube being processed with a fifth step during which a fine mist of water is sprayed onto the area of the scratch to separate the formed cross cut tip from the glass tube.

In step 4 shown in FIG. 7, heat 715 is applied to a scratch 609. The heat is applied as a very fine flame so that to the extent possible, only scratch 609 is heated. In step 5 shown in FIG. 8, end 403 is held in place by rotating chuck 801. A fine spray of water 803 is sprayed towards the region corresponding to scratch 609 heated during step 4 which causes tube 401 to break into two pieces as shown in FIG. 8. The top continues to be held by a rotating chuck (not shown), and the bottom continues be held by rotating chuck 801. At this point, the processing beginning with step 1 can be repeated to make additional glass tips with a cross-cut end until substantially the entire length tube 401 has been used to make such additional glass tips with a cross-cut end. In an embodiment, in order to repeat the steps, tube 401 is lowered before scoring wheel 607 is applied. However, the tube can be lowered any time after step 4 has been completed depending on the specifics of the machine used to make the tips.

Figure 9:
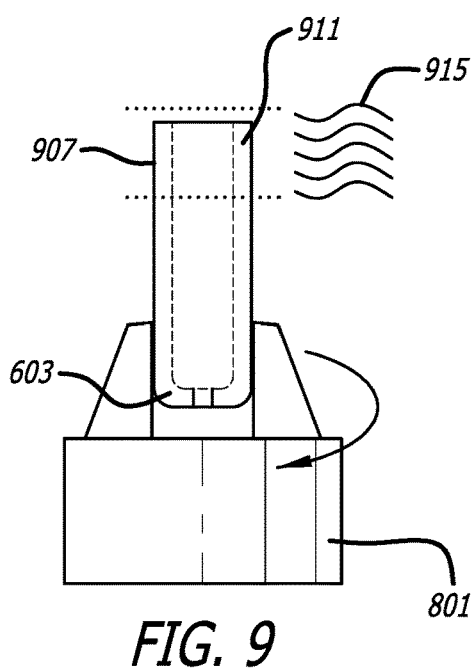
FIG. 9 illustrates the glass tube being processed with a sixth step during which illustrates the glass tube being processed during which the separated end of the tube is heated.

In step 6 shown in FIG. 9, the bottom portion formed during step 5 includes end 603 held by rotating chuck 801 and a top portion 907 adjacent to a top 911. Heat 915 is applied to top portion 907 to soften the sharp edges produced when tube 401 was separated into two pieces during step 5.

Figure 10:
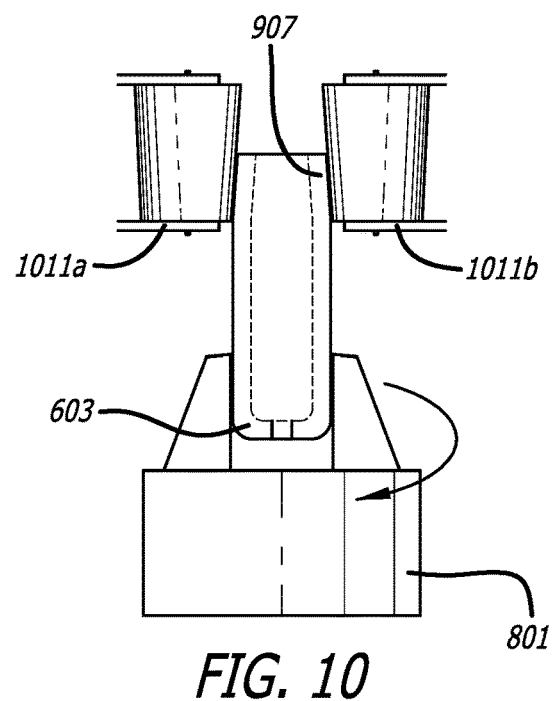
FIG. 10 illustrates the glass tube being processed with a seventh step during which tapered rollers are applied to the end of the tube opposite the cross-cut tip heated during the sixth step to form a slightly tapered end opposite the cross-cut end.

After step 6, in step 7 shown in FIG. 10, tapered rollers 1011*a* and 1011*b* are applied to heated top portion 907 for form a tapered end opposite cross-cut end 603.

In this manner, a cross-cut tip 101 as shown in FIG. 1 is formed. At this point, tube 401 is shorter in length by the length of a single cross-cut tip 101. In this manner, steps 1-7 are repeated to produce additional cross-cut tips 101 until the length of tube 401 has been consumed by the process. In an embodiment, the glass tube introduced in step 1 has a length of about 60 inches, from which approximately 40 glass tips can be produced. Of course, the number of tips produced is a function of the original length of glass tube 401 and the length of each tip 101.

It should be noted that although specific processing parameters (e.g. rotation speed) may be disclosed herein, the parameters can vary depending upon, for example, the machine speed. For example, the heating time of the tip during any processing step disclosed herein depends on machine speed, which may produce around 16 parts per minute (ppm) at a rotation speed of for example, from 200-300 RPM depending on machine speed and desired result. At 16 ppm, heat is applied for about 3 seconds per piece. As noted above, the specific temperatures, and times are dependent on the specifics of the glass or other material used to make the tip. Such specifics are well known to persons having ordinary skill in the art and therefore need not be further disclosed herein.

The direction of applied heat and pressure from rollers as shown in the Figures is horizontal while the direction of the steel rod in FIGS. 5, 7 and 9 is vertical. Of course, these directions depend on the orientation of the machine used in the process, and such directions instead of vertical and horizontal, can be horizontal and vertical, respectively. Accordingly, all references to vertical and horizontal should be understood to mean perpendicular to each other without regard to specific directions.

While certain embodiments have been described and shown in the accompanying drawings, it is to be understood that such embodiments are merely illustrative of and not restrictive on the broad invention. For example, although a glass tip for smoking is described herein, it is contemplated that the tip may be made of any non-flammable material can be manipulated and shaped as described herein and that will hold its shape in use while smoking a smokable substance. Representatively, the tube may be a made of another inflammable material such as a ceramic or insulated metal material. In addition, it should be understood that each of the processing operations disclosed herein may be performed by a single machine or a combination of machines, such that each of the steps are considered automated and capable of being performed without user intervention. Thus, the invention is not limited to the specific constructions and arrangements shown and described herein and various other modifications may occur to those of ordinary skill in the art.

What is claimed is:

1. A method of manufacturing a tip for use with smokable substances, the method comprising:

continuously rotating a tube along its longitudinal axis in one direction;

applying heat in a horizontal and vertical direction to an end of the rotating tube;

squeezing said heated end with rollers and inserting a rotating t-shaped plug into an end of said tube corresponding to said heated end wherein said tube and said plug rotate in a same direction and a same speed;

removing said rollers and t-shaped plug and creating a scratch on said tube a distance from said end corresponding to a length of a manufactured tip using a scoring wheel applied to said tube at said distance;

applying second heat to said tube at said created scratch;

clamping said end with a rotating chuck and spraying a mist of water at said scratch to create a thermal shock to said tube at said scratch to separate said tube into two pieces separated at said distance forming a first piece corresponding to said manufactured tip and a second piece corresponding to a remaining length of said tube;

applying third heat to a section of said first piece between a second end of said first piece extending a distance less than one half of said length;

squeezing said heated section with tapered rollers to taper a diameter of said first piece along said heated section wherein a diameter at said second end is less than a diameter of said first piece extending from said second end.

2. The method defined by claim 1 wherein said heat applied to said end of the rotating tube is with a first burner perpendicularly aligned with said end of the rotating tube and a second burner aligned at an angle of 45 degrees with said rotating tube.

3. The method defined by claim 2 wherein said first and second burners use oxygen, natural gas and compressed air combined to form a flame so that the temperature of the applied heat is set so that the tube to which it is being applied will soften the tube to enable the tube to be shaped.

4. The method defined by claim 1 wherein said rotating is from 200-300 RPM.

5. The method defined by claim 1 where pressure applied by said t-shaped plug and said rollers is approximately 2-4 pounds per square inch.

6. The method defined by claim 5 wherein the pressure is applied for approximately 3 seconds.

7. The method defined by claim 1 wherein said rotating, heating, squeezing, inserting, scratching, spraying and separating are performed repeatedly to produce a plurality of tips from a single tube.

8. The method of claim 1 wherein said tube is a glass material.

9. The method of claim 1 wherein each of said steps is performed serially using a single machine configured to perform each of said steps serially.

\* \* \* \* \*